(12) United States Patent
Ashida

(10) Patent No.: US 7,431,116 B2
(45) Date of Patent: Oct. 7, 2008

(54) SNOW VEHICLE HAVING ENGINE WITH REDUCED VERTICAL DIMENSION

(75) Inventor: Takashi Ashida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 335 days.

(21) Appl. No.: 11/320,561

(22) Filed: Dec. 29, 2005

(65) Prior Publication Data
US 2007/0151787 A1 Jul. 5, 2007

(51) Int. Cl.
B62M 27/02 (2006.01)

(52) U.S. Cl. .................. 180/190; 180/291; 180/292; 180/297

(58) Field of Classification Search .............. 180/190, 180/291, 292, 297
See application file for complete search history.

(56) References Cited

U.S. PATENT DOCUMENTS 5,829,401 A 11/1998 Masuda
6,070,683 A * 6/2000 Izumi et al. .............. 180/190
6,880,659 B2 * 4/2005 Yamamoto .............. 180/190
6,923,287 B2 * 8/2005 Morii .................... 180/292
7,032,561 B2 * 4/2006 Morii et al. ............ 123/195 AC
7,222,689 B2 * 5/2007 Yatagai et al. ............ 180/190
2004/0251072 A1 12/2004 Morii et al.
2005/0247498 A1 * 11/2005 Pichler et al. ............ 180/190

* cited by examiner

Primary Examiner—Joanne Silbermann
Assistant Examiner—Michael R Stabley
(74) Attorney, Agent, or Firm—Keating & Bennett, LLP

(57) ABSTRACT

A snow vehicle includes an engine containing a crankshaft and a balancer shaft, a track belt mounted behind the engine, and a front axle for transmitting the driving power from the engine to the track belt. The balancer shaft is located above a line connecting the crankshaft and the front axle and near the rear end of the crankshaft. The snow vehicle improves the stability of the vehicle during operation while minimizing an increase in the dimension of the engine in the vertical direction.

28 Claims, 6 Drawing Sheets

SNOW VEHICLE HAVING ENGINE WITH REDUCED VERTICAL DIMENSION

BACKGROUND OF INVENTION

1. Field of the Invention

The present invention relates to a snow vehicle and, more particularly, to a snow vehicle equipped with an engine including a crankshaft and a balancer shaft.

2. Description of the Related Art

Heretofore, engines including a crankshaft and a balancer shaft have been known. Such an engine is disclosed, for example, in U.S. Pat. No. 5,829,401.

This disclosed engine is an automotive engine including a crankshaft and a balancer shaft disposed below the crankshaft that is on an extension line of a cylinder shaft.

In the automotive engine disclosed in the above-mentioned patent, it is difficult to reduce the dimension of the engine in the vertical direction because the balancer shaft is positioned below the crankshaft on an extension line of the cylinder shaft. The snow vehicle has the problem that limitations are imposed on the vertical dimension, making it difficult to equip an automotive engine as described above.

Accordingly, a snow vehicle equipped with an engine having a restricted vertical dimension has been heretofore proposed as in U.S. Patent Publication No. 2004/0251072.

In the engine of the snow vehicle proposed in U.S. 2004-251072, a front balancer shaft is disposed ahead of and above a crankshaft, while a rear balancer shaft is located under and to the rear of the crankshaft. The starter motor is positioned to the rear and above the crank shaft. In the snow vehicle disclosed above, the engine is tilted obliquely rearwardly. The front balancer shaft is disposed ahead of and above the crankshaft, whereas the rear balancer shaft is positioned to the rear and below the crankshaft. Consequently, the front and rear balancer shafts can be prevented from being disposed below the crankshaft. As a result, increases in the vertical dimension of the engine can be reduced.

However, in the structure proposed in U.S. 2004-251072, the rear balancer shaft is mounted below the starter motor. This creates an undesirable situation where a heavy starter motor cannot be easily positioned in a lower position. This makes it difficult to place the center of gravity of the engine in a lower position. As a result, there is the problem that the center of gravity of the snow vehicle is not easily placed in a lower position. This results in a problem that the stability of the snow vehicle during operation cannot be easily improved.

SUMMARY OF THE INVENTION

In order to overcome the problems described above, preferred embodiments of the present invention provide a snow vehicle which includes an engine having a reduced vertical dimension and which can provide improved motion stability.

A snow vehicle according to a first preferred embodiment of the present invention provides an engine including a crankshaft and a balancer shaft, a track belt disposed behind the engine, and a front axle for transmitting driving power from the engine to the track belt. The balancer shaft is disposed above a line connecting the crankshaft and the front axle and close to the rear end of the crankshaft.

In the snow vehicle according to this first preferred embodiment, the balancer shaft is disposed near the rear end of the crankshaft as described above. Therefore, increases in the vertical dimension of the engine can be reduced, unlike the case where a balancer shaft is positioned below a crankshaft. Furthermore, because the balancer shaft is positioned above the line connecting the crankshaft and the front axle, a space can be provided below the line connecting the crankshaft and the front axle. A heavy object such as a starter motor can be positioned in this space. This makes it easy to locate the center of gravity of the snow vehicle in a lower position. As a result, the stability of the vehicle during operation can be improved. Furthermore, the balancer shaft can be prevented from being disposed between the crankshaft and the front axle by placing the balancer shaft above the line connecting the crankshaft and the front axle. This makes it possible to place the crankshaft closer to the front axle. Consequently, the center of gravity of the engine can be located closer to the front axle, and as a result closer to the center of gravity of the snow vehicle, which is normally located around the front axle. As a result, the maneuverability of the snow vehicle can be improved.

In the snow vehicle according to the first preferred embodiment described above, there is preferably further provided a starter motor for starting the engine. The starter motor is disposed below the line connecting the crankshaft and the front axle and behind the crankshaft. In this structure, the heavy starter motor can be located at a lower position. Consequently, the center of gravity of the snow vehicle can be easily disposed at a lower position. This makes it easy to improve the stability of the snow vehicle during operation. Furthermore, the center of gravity of the heavy starter motor can be located closer to the center of gravity of the snow vehicle by placing the starter motor behind the crankshaft. As a result, the maneuverability of the snow vehicle can be improved further.

In the snow vehicle according to the first preferred embodiment described above, the engine preferably further includes an output shaft for transmitting driving power from the crankshaft to the outside of the engine. The output shaft is located above the line connecting the crankshaft and the front axle and ahead of the crankshaft. In this structure, the output shaft is shifted to the upper side of the line connecting the crankshaft and the front axle. Therefore, the amount by which the output shaft protrudes ahead of the crankshaft can be made smaller than in the case where the output shaft is disposed on the line connecting the crankshaft and the front axle and ahead of the crankshaft. This can reduce increases in the dimension of the engine in the forward-rearward direction.

In the snow vehicle where the engine includes the output shaft, there is preferably provided a secondary shaft which is disposed behind the crankshaft and which has a first driving power-transmitting portion acting to transmit the driving power from the output shaft to the front axle. The output shaft includes a primary shaft having a second driving power-transmitting portion acting to transmit the driving power to the first driving power-transmitting portion of the secondary shaft. In this structure, the driving power from the crankshaft can be easily transmitted to the front axle via the primary and secondary shafts.

In the snow vehicle where the engine includes the output shaft, the engine preferably further includes a first speed reduction gear mounted to the crankshaft and a second speed reduction gear mounted to the output shaft. The driving power from the crankshaft is transmitted to the output shaft via the first and second speed reduction gears. In this structure, the driving power from the crankshaft can be easily transmitted to the output shaft. Also, the vehicle can be driven under the condition in which the output shaft has been decelerated.

In the snow vehicle according to the above-described first preferred embodiment, the engine preferably includes a pump system disposed inside the engine. The driving power is transmitted to the pump system from the crankshaft via a chain. In this structure, the crankshaft can be used as a driving source for the pump system. Therefore, the number of components can be reduced compared with the case where a separate driving source for the pump is mounted. Furthermore, the weight and size of the engine can be reduced.

In the snow vehicle where the engine includes the pump system, the pump system preferably includes a pump shaft to which the driving power from the crankshaft is transmitted. The pump shaft is disposed below the line connecting the crankshaft and the front axle and ahead of the crankshaft. In this structure, the pump shaft is shifted to the lower side of the line connecting the crankshaft and the front axle. Therefore, the amount by which the pump shaft protrudes ahead of the crankshaft can be reduced compared with the case where the pump shaft is disposed ahead of the crankshaft and on the line connecting the crankshaft and the front axle. As a result, increases in the dimension of the engine in the forward-rearward direction can be reduced.

In the snow vehicle where the pump system includes the pump shaft to which the driving power is transmitted from the crankshaft, the pump system preferably further includes an oil pump and a water pump. The pump shafts of the oil pump and of the water pump are arranged coaxially. In this structure, the mechanisms for driving the oil and water pumps can be simplified. Consequently, the weight and size of the engine can be reduced.

In the snow vehicle where the pump system includes the oil pump and water pump, the oil pump preferably is disposed near the widthwise center of the engine. The water pump is disposed outside the oil pump in the widthwise direction of the engine. In this structure, the oil pump can be placed close to an oil pan because the oil pan is normally placed near the widthwise center of the engine. In addition, a pipe running from the water pump can be easily connected with a radiator disposed outside the engine by placing the water pump outside the oil pump in the widthwise direction of the engine.

In the snow vehicle according to the first preferred embodiment described above, the engine is preferably mounted to the crankshaft. There is further provided a first speed reduction gear for transmitting the driving power from the crankshaft to the output shaft. The driving power from the first speed reduction gear is transmitted to the balancer shaft. In this structure, the first speed reduction gear can be used also as a gear for transmitting the driving power from the crankshaft to the balancer shaft. Therefore, there is no need to provide a separate gear and the like to the crankshaft to transmit the driving power from the crankshaft to the balancer shaft. As a result, increases in the number of components can be minimized. In addition, the weight and size of the engine can be reduced.

In this case, the engine preferably further includes a balancer shaft-driving gear mounted to the balancer shaft. The balancer shaft-driving gear is disposed to engage the first speed reduction gear. In this structure, the driving power from the crankshaft can be easily transmitted to the balancer shaft via the first speed reduction gear and balancer shaft-driving gear.

In the snow vehicle where the engine includes the balancer shaft-driving gear, the engine preferably further includes a camshaft for driving intake and exhaust valves and a cam chain for transmitting the driving power from the crankshaft to the camshaft. A balancer weight and a balancer shaft-driving gear which are spaced from each other by a given distance are mounted to the balancer shaft. The cam chain is disposed between the balancer weight and the balancer shaft-driving gear axially of the balancer shaft. In this structure, the cam chain can be prevented from coming into contact with the balance weight and balancer shaft-driving gear on the balancer shaft. Consequently, the cam chain can be disposed closer to the balancer shaft in the forward-rearward direction. As a result, increases in the dimension of the engine in the forward-rearward direction can be reduced.

In the snow vehicle according to the first preferred embodiment described above, the engine is preferably positioned to tilt rearwardly. In this structure, the center of gravity of the engine can be placed more rearwardly. Consequently, the center of gravity of the engine can be located closer to the center of gravity of the snow vehicle. As a result, the maneuverability of the snow vehicle can be improved further.

In the snow vehicle according to the first preferred embodiment described above, the engine is preferably a four-stroke engine. In this structure of a snow vehicle, increases in the dimension of the engine in the vertical direction can be reduced even in the case of the four-stroke engine which would normally tend to be bulky because a starter motor and other components are necessary. At the same time, the motion stability and maneuverability of the vehicle can be improved.

A snow vehicle according to a second preferred embodiment of the present invention includes an engine including a crankshaft and a balancer shaft, an intake passage disposed in a front portion of the engine, an exhaust passage disposed in a rear portion of the engine, a track belt disposed behind the engine, and a front axle for transmitting driving power from the engine to the track belt. The balancer shaft is disposed above a line connecting the crankshaft and the front axle and near the rear end of the crankshaft.

In the snow vehicle according to the second preferred embodiment described above, increases in the dimension of the engine in the vertical direction can be reduced, unlike in the case where the balancer shaft is disposed below the crankshaft, by placing the balancer shaft near the rear end of the crankshaft. Furthermore, a space can be provided below the line connecting the crankshaft and the front axle by placing the balancer shaft above the line connecting the crankshaft and the front axle. A heavy starter motor and other components can be placed in this space. This makes it easy to locate the center of gravity of the snow vehicle at a lower position. As a result, the stability of the vehicle during operation can be improved. In addition, the balancer shaft can be prevented from being disposed between the crankshaft and front axle by placing the balancer shaft above the line connecting the crankshaft and front axle. Consequently, the crankshaft can be placed closer to the front axle. As a result, the center of gravity of the engine can be located closer to the front axle. Therefore, the center of gravity of the engine can be located closer to the center of gravity of the snow vehicle that is normally disposed near the front axle. As a result, the maneuverability can be improved.

The snow vehicle according to the second preferred embodiment described above preferably further includes a starter motor for starting the engine. The starter motor is disposed below the line connecting the crankshaft and the front axle and behind the crankshaft. In this structure, the heavy starter motor can be located in a lower position and so the center of gravity of the snow vehicle can be easily located at a lower position. This makes it easy to improve the stability of the snow vehicle during operation. In addition, the center of gravity of the starter motor that is heavy can be placed closer to the center of gravity of the snow vehicle by placing the starter motor behind the crankshaft. Consequently, the maneuverability of the snow vehicle can be improved further.

In the snow vehicle according to the second preferred embodiment described above, the engine preferably further includes an output shaft for transmitting driving power from the crankshaft to the outside of the engine. The output shaft is disposed above a line connecting the crankshaft and the front axle and ahead of the crankshaft. In this structure, the output shaft is shifted to the upper side of the line connecting the crankshaft and the front axle. Therefore, the amount by which the output shaft protrudes ahead of the crankshaft can be reduced compared with the case where the output shaft is disposed on the line connecting the crankshaft and the front axle and ahead of the crankshaft. Consequently, increases in the dimension of the engine in the forward-rearward direction can be reduced.

In the snow vehicle where the engine includes the output shaft, there is preferably provided a secondary shaft which is located behind the crankshaft and which has a first driving power-transmitting portion. The first driving power-transmitting portion transmits the driving power from the output shaft to the front axle. The output shaft includes a primary shaft having a second driving power-transmitting portion for transmitting the driving power to the first driving power-transmitting portion of the secondary shaft. In this structure, the driving power from the crankshaft can be easily transmitted to the front axle via the primary and secondary shafts.

In the snow vehicle where the engine includes the output shaft, the engine preferably further includes a first speed reduction gear mounted to the crankshaft and a second speed reduction gear mounted to the output shaft. The driving power from the crankshaft is transmitted to the output shaft via the first and second speed reduction gears. In this structure, the driving power from the crankshaft can be easily transmitted to the output shaft. Also, the vehicle can be driven under the condition where the output shaft has been decelerated.

In the snow vehicle according to the second preferred embodiment described above, the engine preferably further includes a pump system disposed inside the engine. The driving power is transmitted to the pump system from the crankshaft via the chain. In this structure, the crankshaft can be used as a driving source for the pump system. Therefore, the number of components can be minimized compared with the case where there is provided a separate driving source for driving the pump system. Furthermore, the weight and size of the engine can be reduced.

In the snow vehicle where the engine includes the pump system, the pump system preferably includes a pump shaft to which the driving power is transmitted from the crankshaft. The pump shaft is disposed below the line connecting the crankshaft and the front axle and ahead of the crankshaft. In this structure, the pump shaft is shifted to the lower side of the line connecting the crankshaft and the front axle. Therefore, the amount by which the pump shaft protrudes ahead of the crankshaft can be reduced compared with the case where the pump shaft is placed on the line connecting the crankshaft and the front axle and ahead of the crankshaft. Consequently, increases in the dimension of the engine in the forward-rearward direction can be reduced.

In the snow vehicle where the pump system includes the pump shaft to which the driving power is transmitted from the crankshaft, the pump system preferably further includes an oil pump and a water pump. The pump shafts of the oil and water pumps are arranged coaxially. In this structure, mechanisms for driving the oil and water pumps can be simplified. Consequently, the weight and size of the engine can be reduced.

In the snow vehicle where the pump system includes the oil pump and water pump, the oil pump is preferably disposed near the widthwise center of the engine, and the water pump is placed outside the oil pump in the widthwise direction of the engine. In this structure, the oil pump can be placed near an oil pan, which is normally disposed near the widthwise center of the engine. Furthermore, a pipe running from the water pump can be easily connected with a radiator located outside the engine, by placing the water pump outside the oil pump in the widthwise direction of the engine.

In the snow vehicle according to the second preferred embodiment described above, the engine is preferably mounted to the crankshaft and further includes a first speed reduction gear for transmitting the driving power from the crankshaft to the output shaft. The driving power is transmitted to the balancer shaft from the first speed reduction gear. In this structure, the first speed reduction gear can be used as a gear for transmitting the driving power from the crankshaft to the balancer shaft. Therefore, it is not necessary to provide a separate gear and the like to the crankshaft to transmit the driving power from the crankshaft to the balancer shaft. Consequently, increases in the number of components can be minimized. Furthermore, the weight and size of the engine can be reduced.

In this case, the engine preferably further includes a balancer shaft-driving gear mounted to the balancer shaft. The balancer shaft-driving gear is positioned to engage the first speed reduction gear. In this structure, the driving power from the crankshaft can be easily transmitted to the balancer shaft via the first speed reduction gear and balancer shaft-driving gear.

In the snow vehicle where the engine includes the balancer shaft-driving gear, the engine preferably further includes a camshaft for driving the intake and exhaust valves and a cam chain for transmitting the driving power from the crankshaft to the camshaft. A balancer weight and a balancer shaft-driving gear which are spaced from each other by a given distance are mounted to the balancer shaft. The cam chain is disposed between the balancer weight and balancer shaft-driving gear axially of the balancer shaft. In this structure, the cam chain can be prevented from coming into contact with the balancer weight and balancer shaft-driving gear on the balancer shaft. Therefore, the cam chain can be placed closer to the balancer shaft in the forward-rearward direction. As a consequence, increases in the dimension of the engine in the forward-rearward direction can be reduced.

In the snow vehicle according to the second preferred embodiment described above, the engine is preferably arranged so as to tilt rearwardly. In this structure, the center of gravity of the engine can be located more rearwardly and so the center of gravity of the engine can be located closer to the center of gravity of the snow vehicle. Consequently, the maneuverability of the vehicle can be improved further.

In the snow vehicle according to the second preferred embodiment described above, the engine is preferably a four-stroke engine. In this structure, increases in the dimension of the engine in the vertical direction can be reduced even in a case where there is equipped a four-stroke engine which tends to be bulky because of necessity of a starter motor and other components. At the same time, the stability and maneuverability of the snow vehicle during operation can be improved.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Preferred embodiments of the present invention are hereinafter described with reference to the drawings.

The structure of a snowmobile 1 according to a first preferred embodiment of the present invention is described in detail by referring to FIGS. 1-6. In the present preferred embodiment, a snowmobile is taken as an example of the snow vehicle of the present invention. In the figures, the arrow FWD indicates the forward direction of the snowmobile during operation. The arrow W indicates the widthwise direction of the vehicular body.

Figure 1:
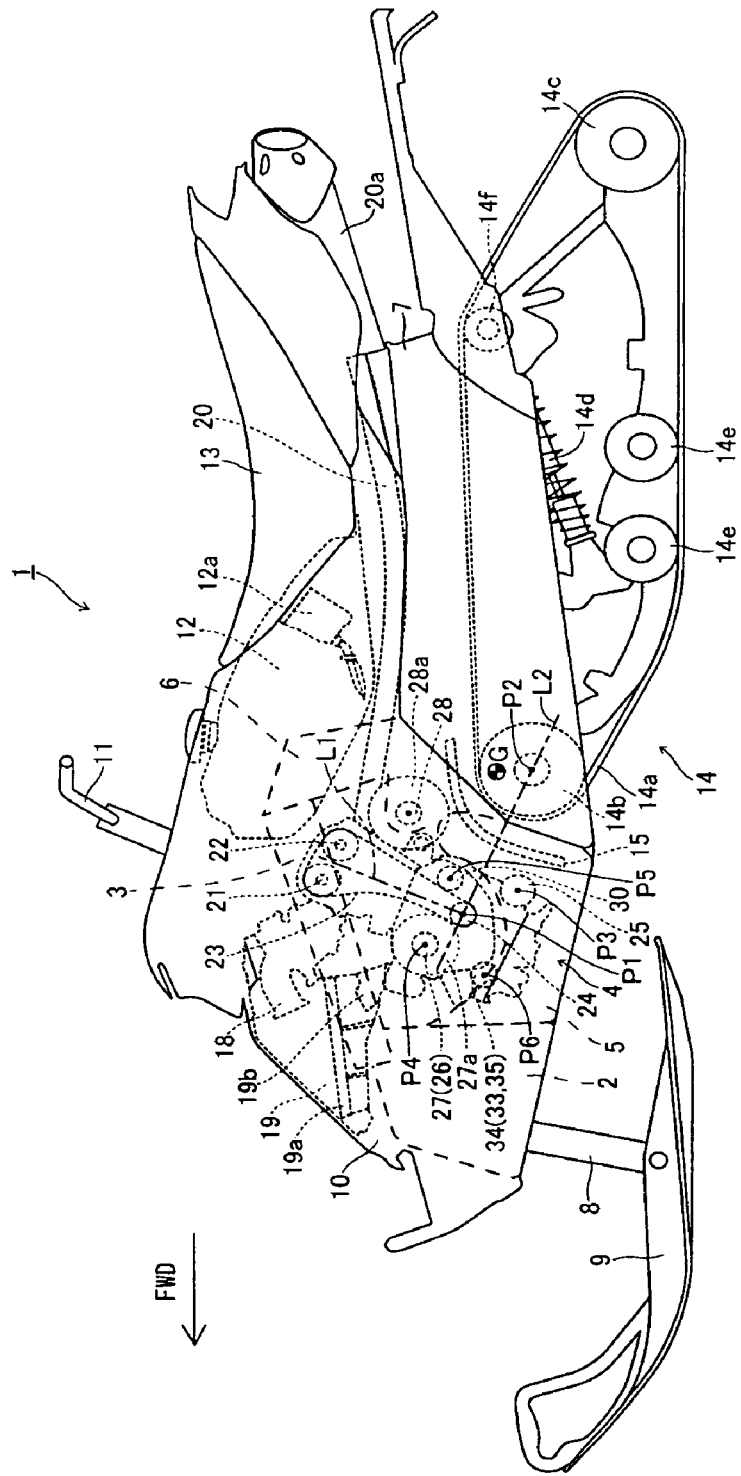
FIG. 1 is a side elevation of the whole structure of a snowmobile according to a preferred embodiment of the present invention.
Figure 2:
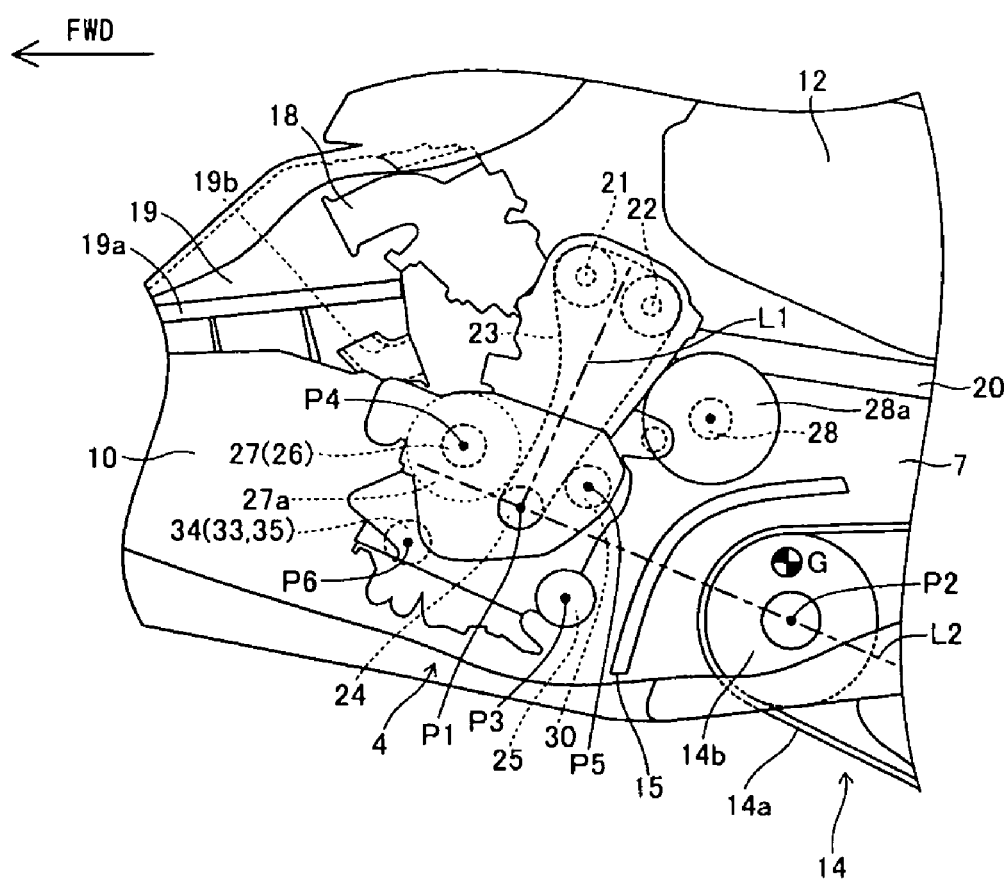
FIG. 2 is a side elevation of the engine and its surroundings of a snowmobile according to a preferred embodiment of the present invention.

In the snowmobile 1 according to a first preferred embodiment of the invention, a front frame 2 is disposed in a front portion of the vehicular body as shown in FIGS. 1 and 2. A main frame 3 is connected with an upper portion of the front frame 2. The main frame 3 is arranged so as to extend rearwardly from above a four-stroke engine (hereinafter simply referred to as the engine) 4. A lower frame 5 is connected with a lower portion of the front frame 2. The lower frame 5 is arranged so as to extend rearwardly from under the engine 4. A connecting frame 6 is connected with rear portions of the main frame 3 and lower frame 5. A rear frame 7 is disposed behind the lower frame 5 and connecting frame 6. The rear frame 7 is arranged so as to extend rearwardly. The front frame 2, main frame 3, lower frame 5, connecting frame 6, and rear frame 7 together define a vehicular frame.

A pair of ski holders 8 and a pair of skis 9 are disposed on right and left sides toward the direction of movement FWD and below the front frame 2. As the ski holders 8 rotate, the skis 9 rotate left and right. A front cowl 10 is mounted ahead of and above the front frame 2 and provides a cover over the front portion of the vehicular body.

Handlebars 11 for steering the skis 9 are disposed over the main frame 3 and connected with the ski holders 8. A fuel tank 12 having a fuel pump 12a is disposed over the connecting frame 6.

A seat 13 is placed over the rear frame 7. A driving track 14 is disposed under the rear frame 7. The driving track 14 includes a track belt 14a made of rubber, a front axle 14b and a rear axle 14c both of which are disposed inside the track belt 14a, and a shock-absorbing suspension 14d. The front axle 14b has a function of rotating the track belt 14a by the driving power from the engine 4. This permits the snowmobile 1 to be driven. A plurality of guide wheels 14e and 14f are arranged inside the track belt 14a to minimize loosening of the belt 14a.

Figure 3:
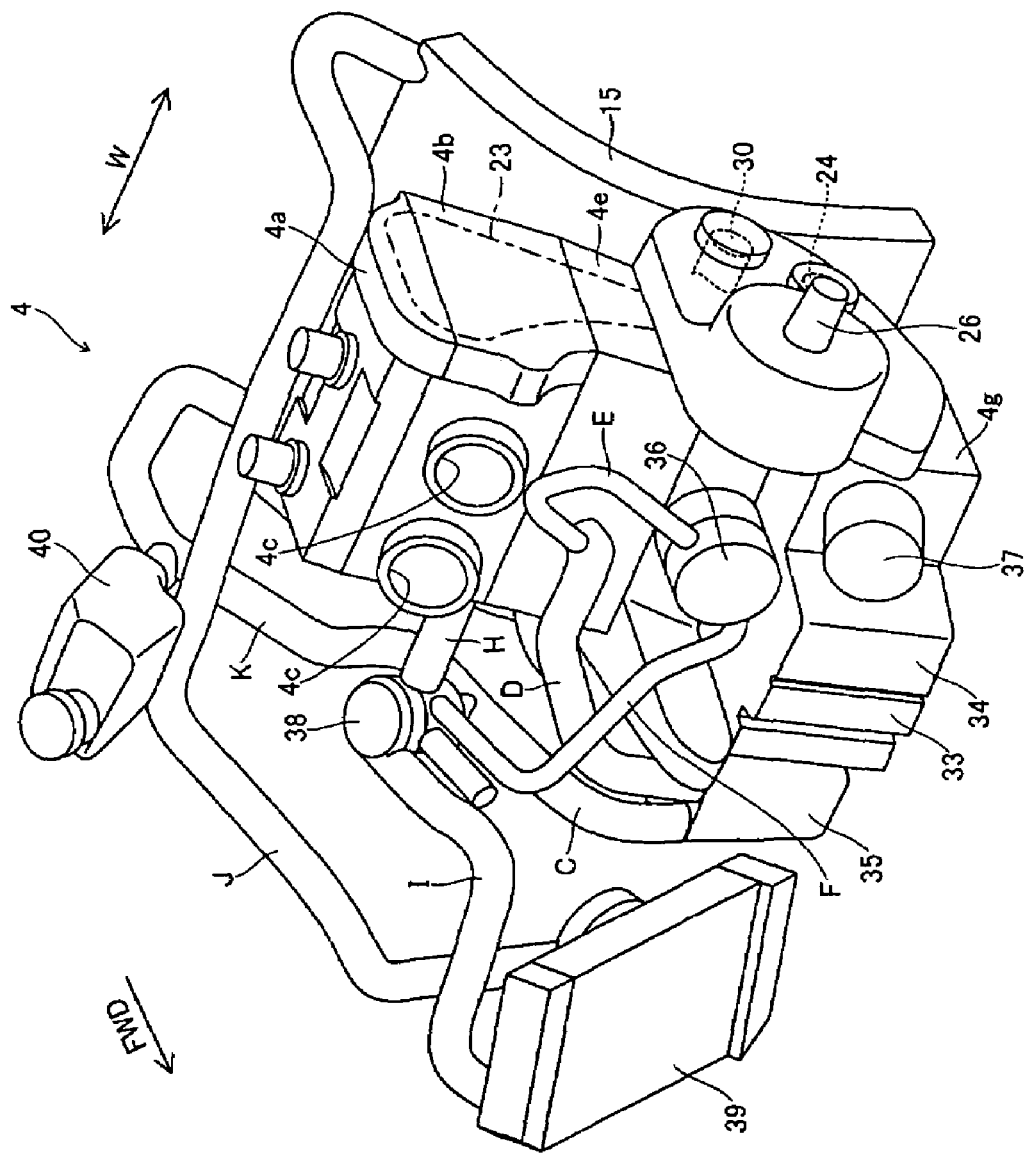
FIG. 3 is a front perspective view of the engine and its surroundings of the snowmobile according to the preferred embodiment shown in FIG. 1.
Figure 5:
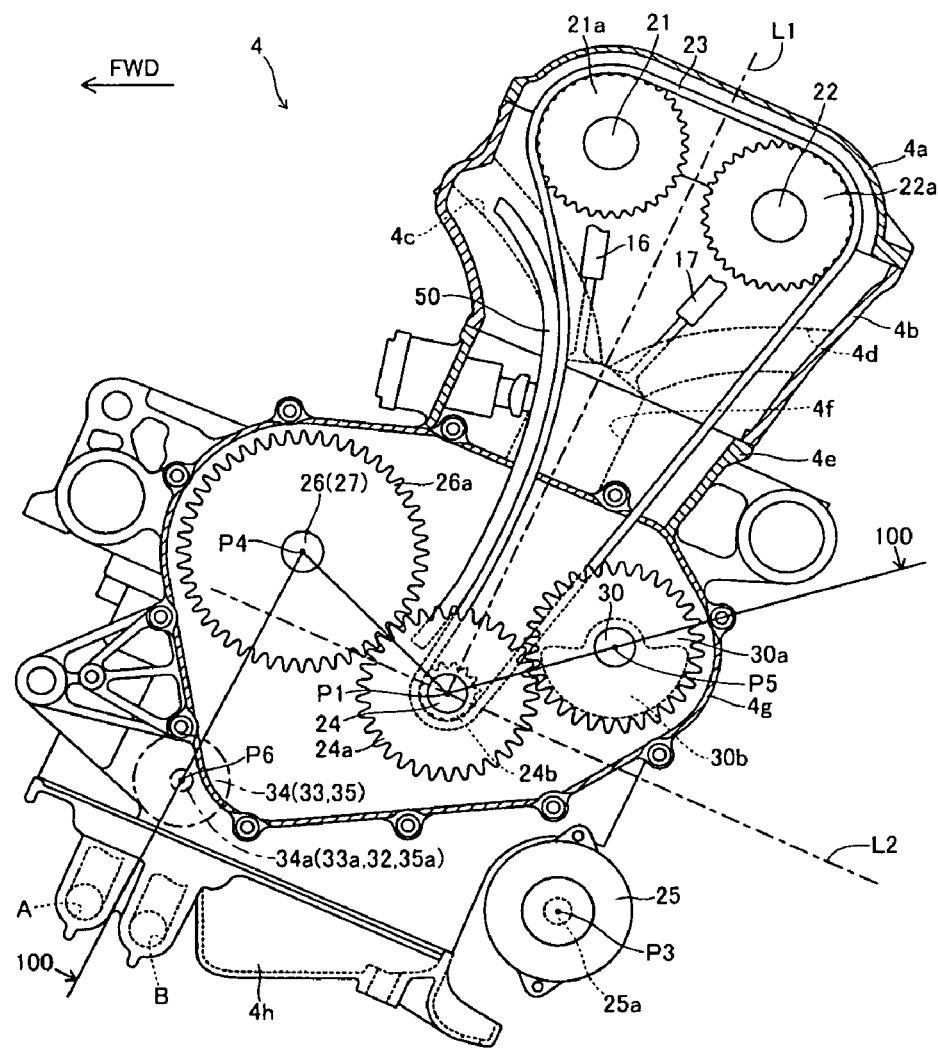
FIG. 5 is a side elevation in cross section of the engine of the snowmobile according to the preferred embodiment shown in FIG. 1.

The engine 4 is disposed ahead of and above the front axle 14b. A heat exchanger 15 is positioned between the engine 4 and the front axle 14b. The heat exchanger 15 has a function of cooling the coolant passing through the heat exchanger 15 by snow splashing from the track belt 14a. As shown in FIGS. 3 and 5, a cylinder head cover 4a and a cylinder head 4b are mounted in an upper portion of the engine 4. As shown in FIG. 5, an intake valve 16 and an exhaust valve 17 are disposed inside the cylinder head 4b. The intake valve 16 has a function of opening and closing an intake passage 4c. The exhaust valve 17 has a function of opening and closing an exhaust passage 4d.

Figure 4:
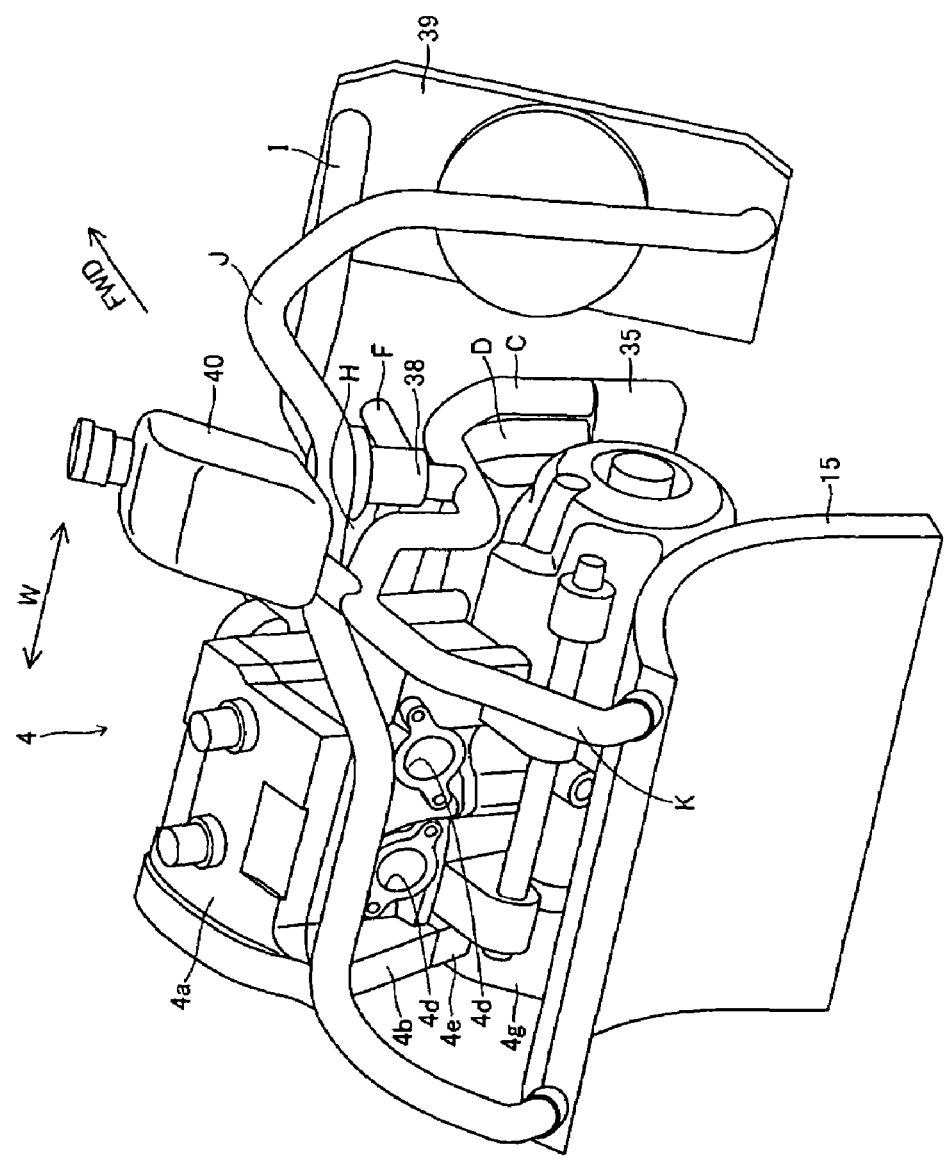
FIG. 4 is a rear perspective view of the engine and its surroundings of the snowmobile according to the preferred embodiment shown in FIG. 1.

In the present preferred embodiment, as shown in FIGS. 3 and 5, the intake passage 4c is connected with the front surface of the cylinder head 4b. The exhaust passage 4d is connected with the rear surface of the cylinder head 4b as shown in FIGS. 4 and 5. As shown in FIG. 2, an intake tube 18 is connected with the intake passage 4c (see FIG. 3). A filter 19a in an air cleaner 19 is disposed under the intake tube 18 to minimize intrusion of snow and dust into the intake tube 18. An intake port 19b is provided in a lower portion of the filter 19a of the air cleaner 19 to suck air from behind. As shown in FIG. 1, an exhaust tube 20 is connected with the exhaust passage 4d (see FIG. 5). The exhaust tube 20 bends to the right and rearwardly as viewed from the direction of motion of the vehicle. A muffler 20a is mounted to a rear portion of the exhaust tube 20. Camshafts 21 and 22 are disposed over the intake valve 16 and exhaust valve 17, respectively, as shown in FIG. 5 to control the operation of the valves 16 and 17. Camshaft gears 21a and 22a are mounted to the camshafts 21a and 22, respectively. A cam chain 23 is attached to the camshaft gears 21a and 22a. A cam chain tensioner 50 applies tension to the cam chain 23.

A cylinder block 4e is positioned under the cylinder head 4b. Cylinders 4f are mounted inside the cylinder block 4e. The centerline L1 of the cylinders 4f is positioned to tilt rearwardly as shown in FIG. 1 and is substantially perpendicular to a line L2 connecting the center P1 of a crankshaft 24 (described below) and the center P2 of the front axle 14b as viewed from a side of the vehicular body. This permits the center of gravity of the engine 4 to be positioned in a rear position. As a result, the center of gravity of the engine 4 can be located closer to the center of gravity G of the snowmobile 1. As a result, the maneuverability of the vehicle can be improved.

A crankcase 4g is disposed in a lower portion of the cylinder block 4e. As shown in FIG. 5, a starter motor 25 for starting the engine 4 is mounted in a rear, lower portion of the crankcase 4g. In the present preferred embodiment, the center P3 of the starter motor shaft 25a of the starter motor 25 is located under the line L2 connecting the center P1 of the crankshaft 24 and the center P2 of the front axle 14b (see FIG. 1) and behind the crankshaft 24.

Figure 6:
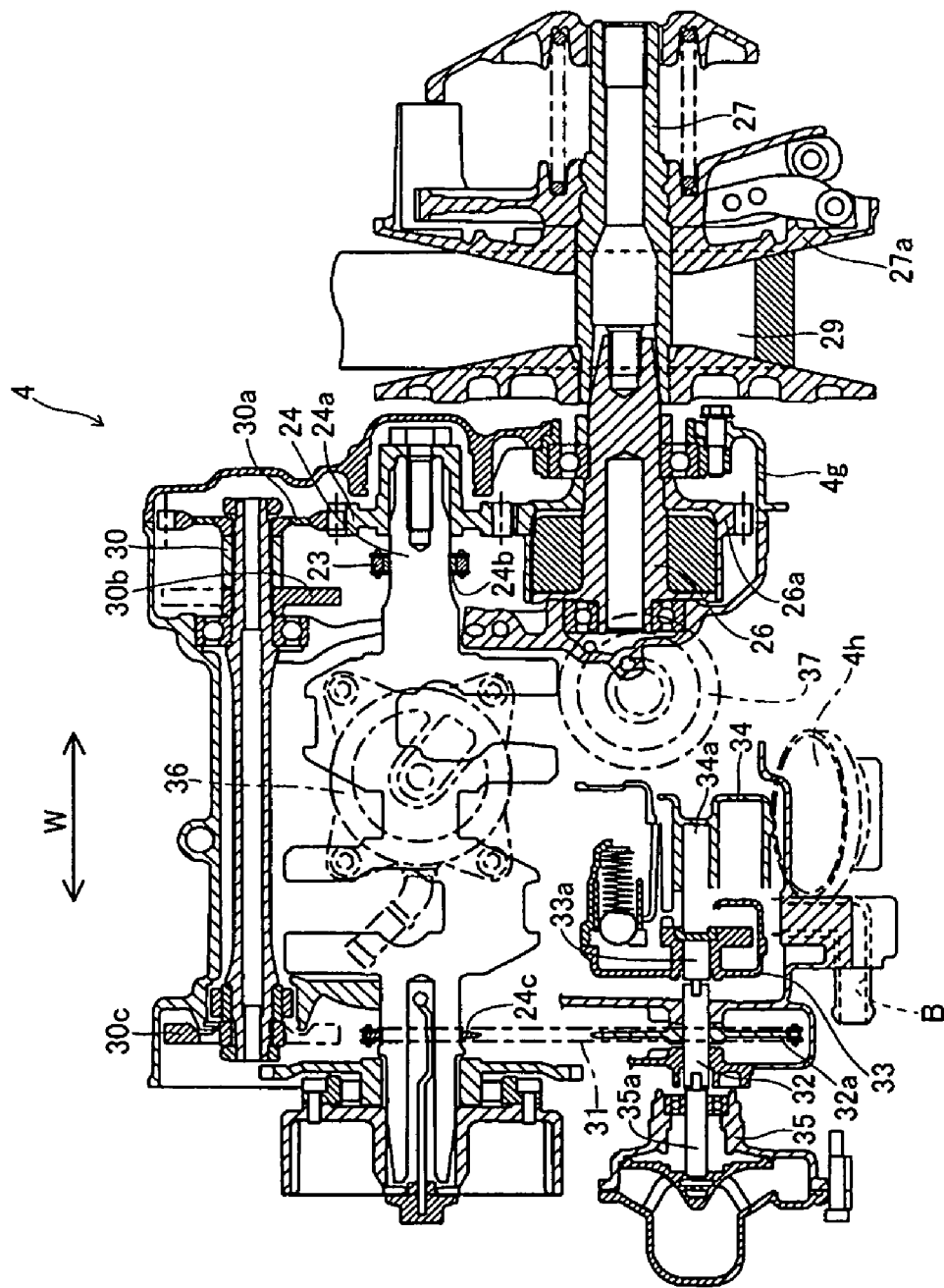
FIG. 6 is a cross-sectional view taken along the line 100-100 of FIG. 5.

The crankshaft 24 is disposed inside the crankcase 4g and in a position on the centerline L1 of the cylinders 4f. As shown in FIG. 6, a speed reduction gear 24a, a gear 24b for the cam chain, and a gear 24c for the pump system are mounted to the crankshaft 24. The speed reduction gear 24a is one example of the "first speed reduction gear" of the present preferred embodiment of the invention.

In the present preferred embodiment, the speed reduction gear 24a is connected with an internal primary shaft 26 via the speed reduction gear 26a. Consequently, the rotation of the crankshaft 24 can be transmitted to the internal primary shaft 26 after decelerating the rotation to some extent. The internal primary shaft 26 is one example of the "output shaft" of the present preferred embodiment of the invention. The speed reduction gear 26a is one example of the "second speed reduction gear" of the present preferred embodiment of the invention. The internal primary shaft 26 protrudes out of the crankcase 4g and is connected with an external primary shaft 27. The external primary shaft 27 is one example of the "output shaft" and "primary shaft" of the present preferred embodiment of the present invention.

In the present preferred embodiment, as shown in FIG. 1, the center P4 of the internal primary shaft 26 and external primary shaft 27 is located above the line L2 connecting the center P1 of the crankshaft 24 and the center P2 of the front axle 14*b* and ahead of the crankshaft 24. A primary sheave 27*a* having a function of achieving a continuously variable gear ratio is mounted to the external primary shaft 27 as shown in FIG. 6. The primary sheave 27*a* is one example of the "second driving power-transmitting portion" of the present preferred embodiment of the invention. A secondary shaft 28 equipped with a secondary sheave 28*a* having a function of achieving a continuously variable gear ratio is positioned behind the primary sheave 27*a* as shown in FIG. 1. The secondary sheave 28*a* is one example of the "first driving power-transmitting portion" of the present preferred embodiment of the invention. A V-belt 29 (see FIG. 6) is attached to the primary sheave 27*a* and secondary sheave 28*a*. The driving power from the external primary shaft 27 is transmitted to the secondary shaft 28 by the V-belt 29. The driving power is then transmitted to the front axle 14*b* via a speed reduction chain (not shown). In this way, the driving track 14 can be driven in a sufficiently decelerated state.

In the present preferred embodiment, the speed reduction gear 24*a* is connected with a balancer shaft 30 via the balancer shaft-driving gear 30*a* as shown in FIG. 6. Balancer weights 30*b* and 30*c* are mounted to the balancer shaft 30 at a given distance from the balancer shaft-driving gear 30*a* axially of the balancer shaft 30 to minimize vibrations due to rotation of the crankshaft 24.

In the present preferred embodiment, the center P5 of the balancer shaft 30 is located above the line L2 connecting the center P1 of the crankshaft 24 and the center P2 of the front axle 14*b* and near the rear end of the crankshaft 24 as shown in FIG. 1.

As shown in FIGS. 5 and 6, the cam chain 23 is mounted to the gear 24*b* for the cam chain 23. Thus, the driving power from the crankshaft 24 can be transmitted to the camshafts 21 and 22 (see FIG. 5) via the cam chain 23.

In the present preferred embodiment, as shown in FIG. 6, the gear 24*b* for the cam chain 23 and the cam chain 23 are disposed between the balancer weights 30*b*, 30*c* and the balancer shaft-driving gear 30*a* axially of the balancer shaft 30 to prevent the cam chain 23 from touching the balancer weights 30*b*, 30*c* and balancer shaft-driving gear 30*a* on the balancer shaft 30 as shown in FIG. 5. Therefore, the cam chain 23 can be placed closer to the balancer shaft 30 in the forward-rearward direction. As a consequence, increases in the dimension of the engine 4 in the forward-rearward direction can be reduced.

Furthermore, a chain 31 is mounted between the gear 24*c* on the crankshaft 24 for the pump system and a transfer shaft gear 32*a* of a transfer shaft 32. A feed pump shaft 33*a* of a feed pump 33 is directly connected with the inner end of the transfer shaft 32. A scavenge pump shaft 34*a* of a scavenge pump 34 is connected with the feed pump shaft 33*a* of the feed pump 33. A water pump shaft 35*a* of a water pump 35 is directly mounted to the outer end of the transfer shaft 32. The feed pump 33 is one example of the "pump" and "oil pump" of the present preferred embodiment of the invention. The feed pump shaft 33*a* is one example of the "pump shaft" of the present preferred embodiment of the invention. The scavenge pump 34 is one example of the "pump" and "oil pump" of the present preferred embodiment of the invention. The scavenge pump shaft 34*a* is one example of the "pump shaft" of the present preferred embodiment of the invention. The water pump 35 is one example of the "pump" of the present preferred embodiment of the invention. The water pump shaft 35*a* is one example of the "pump shaft" of the present preferred embodiment of the invention.

In the present preferred embodiment, as shown in FIG. 5, the centers P6 of the scavenge pump shaft 34*a* of the scavenge pump 34, the feed pump shaft 33*a* of the feed pump 33, and the water pump shaft 35*a* of the water pump 35 are arranged coaxially. The centers P6 are located below the centerline L2 connecting the center P1 of the crankshaft 24 and the center P2 of the front axle 14*b* and ahead of the crankshaft 24 (see FIG. 1).

The oil pump including the scavenge pump 34 and the feed pump 33 has functions of reducing friction on each sliding part inside the engine 4 and cooling it. In particular, the scavenge pump 34 is mounted below and close to the center of the crankcase 4*g* in the width wise direction (direction indicated by the arrow W) as shown in FIG. 6. The scavenge pump 34 has a function of supplying oil in an oil pan 4*h* mounted under the scavenge pump 34 into an oil tank (not shown) via an oil passage A (see FIG. 5), the oil tank being disposed outside the engine 4. The feed pump 33 has a function of drawing up the oil in the oil tank (not shown) via an oil passage B and supplying the oil to the surroundings of the crankshaft 24 and to the surroundings of the camshafts 21 and 22 (see FIG. 5) via an oil cooler 36, an oil cleaner 37, and a main gallery (oil passage) (not shown). The oil supplied to the various parts inside the engine 4 is returned to the oil pan 4*h* mounted in the center of the bottom of the crankcase 4*g*.

A coolant passage C connected with a thermostat 38 is connected with the water pump 35 as shown in FIGS. 3 and 4. The thermostat 38 has a function of measuring the temperature of the supplied coolant and controlling the route through which the coolant passes. A coolant passage D connected with the front surface of the cylinder block 4*e* is connected with the water pump 35. A coolant passage E (see FIG. 3) that has a diameter smaller than that of the coolant passage D and is connected with the oil cooler 36 (see FIG. 3) is connected with the coolant passage D. A coolant passage F connected with the thermostat 38 is connected with the oil cooler 36. A coolant passage H connected with the thermostat 38 is connected with a side surface of the cylinder block 4*e*. A coolant passage I connected with a radiator 39 is connected with the thermostat 38. The radiator 39 has a function of cooling the coolant passing through it. A coolant passage J connected with an upper portion of one end of the heat exchanger 15 is connected with the radiator 39. A coolant passage K connected with the thermostat 38 is connected with an upper portion of the other end of the heat exchanger 15. A reserve tank 40 is mounted to the coolant passage K. The reserve tank 40 has a function of adjusting the amount of coolant in the engine 4 to be constant and taking in air if air bubbles are produced inside the coolant passage K in case the coolant expands or shrinks due to temperature variations.

The water pump 35 (see FIG. 3) has a function of supplying the coolant into the coolant passage D to hold the temperature of the engine 4 at an appropriate temperature. In particular, a portion of the coolant supplied to the coolant passage D is fed into the oil cooler 36 (see FIG. 3) via the coolant passage E (see FIG. 3). After cooling the oil inside the oil cooler 36, the coolant is supplied into the thermostat 38 via the coolant passage F. The remaining amount of the coolant supplied into the coolant passage D is supplied into the engine 4. Then, the coolant cools the cylinder head 4*b* and cylinder block 4*e* and the like and is supplied to the thermostat 38 from the coolant passage H.

At this time, in a case where the temperature of the coolant supplied into the thermostat 38 is higher than a given temperature, the coolant passes through the thermostat 38 and is supplied into the radiator 39 via the coolant passage I. The coolant is then supplied to the heat exchanger 15 via the coolant passage J. Thereafter, the coolant is returned to the water pump 35 via the coolant passages K and C.

In a case where the temperature of the coolant supplied to the thermostat 38 is lower than a given temperature (for example, when the engine 4 is started), the coolant passes through the thermostat 38 and is returned to the water pump 35 via the coolant passage C. That is, the coolant keeps circulating through the engine 4 and oil cooler 36 without passing through the radiator 39 or heat exchanger 15 until the temperature of the coolant rises above the given temperature.

In the present preferred embodiment, increases in the dimension of the engine 4 in the vertical direction can be prevented by locating the balancer shaft 30 close to the rear end of the crankshaft 24 as described above, unlike the case where the balancer shaft 30 is placed below the crankshaft 24. Furthermore, the heavy starter motor 25 can be placed below the line L2 connecting the center P1 of the crankshaft 24 and the center P2 of the front axle 14b by placing the center P5 of the balancer shaft 30 above the line L2 connecting the center P1 of the crankshaft 24 and the center P2 of the front axle 14b and placing the center P3 of the starter motor shaft 25a of the starter motor 25 below the line L2 connecting the center P1 of the crankshaft 24 and the center P2 of the front axle 14b. Therefore, the center of gravity G of the snowmobile 1 can be easily located at a lower position. Consequently, the stability of the snowmobile 1 during operation can be improved. In addition, the crankshaft 24 can be placed closer to the front axle 14b because the balancer shaft 30 can be prevented from being disposed between the crankshaft 24 and front axle 14b by placing the center P5 of the balancer shaft 30 above the line L2 connecting the center P1 of the crankshaft 24 and the center P2 of the front axle 14b. Consequently, the center of gravity of the engine 4 can be located closer to the front axle 14b. As a result, the center of gravity of the engine 4 can be located closer to the center of gravity G of the snowmobile 1 and placed near the front axle 14b. As a result, the maneuverability of the vehicle can be improved.

In addition, in the present preferred embodiment, the center of gravity of the heavy starter motor 25 can be located closer to the center of gravity G of the snowmobile 1 by placing the starter motor 25 behind the crankshaft 24. Consequently, the maneuverability of the vehicle can be improved further.

Further, in the present preferred embodiment, the center P4 of the internal primary shaft 26 and external primary shaft 27 is shifted to the upper side of the line L2 connecting the center P1 of the crankshaft 24 and the center P2 of the front axle 14b, by placing the center P4 of the internal primary shaft 26 and external primary shaft 27 above the line L2 connecting the center P1 of the crankshaft 24 and the center P2 of the front axle 14b and ahead of the crankshaft 24. Therefore, the amount by which the internal primary shaft 26 and external primary shaft 27 protrude forwardly of the crankshaft 24 can be reduced compared with the case where the center P4 of the internal primary shaft 26 and external primary shaft 27 is placed on the line L2 connecting the center P1 of the crankshaft 24 and the center P2 of the front axle 14b and ahead of the crankshaft 24. As a consequence, increases in the dimension of the engine 4 in the forward-rearward direction can be prevented.

Furthermore, in the present preferred embodiment, the crankshaft 24 can be used as a driving source for the feed pump 33, scavenge pump 34, and water pump 35 by designing the feed pump 33, scavenge pump 34, and water pump 35 such that the driving power is transmitted to them from the crankshaft 24 via the chain 31. Consequently, the number of components can be reduced compared with the case where there is mounted a separate driving source for driving the feed pump 33, scavenge pump 34, and water pump 35. Also, the weight and size of the engine 4 can be reduced.

In addition, in the present preferred embodiment, the speed reduction gear 24a can be used also as a gear for transmitting the driving power from the crankshaft 24 to the balancer shaft 30 by designing the balancer shaft 30 such that the driving power is transmitted to the shaft 30 from the speed reduction gear 24a. Therefore, it is not necessary to mount a separate gear and the like on the crankshaft 24 to transmit the driving power from the crankshaft 24 to the balancer shaft 30. Consequently, increases in the number of components can be minimized. Also, the weight and size of the engine 4 can be reduced.

It is to be understood that the preferred embodiments disclosed herein are illustrative of the present invention, but are not to be considered restrictive. The scope of the present invention is delineated by the appended claims and not by the description of the foregoing preferred embodiments. In addition, the present invention embraces every modification included in the scope delineated by the claims and its equivalents.

For example, in the above preferred embodiment, a snowmobile is shown as one example of a snow vehicle. The present invention is not limited to this. The present invention can also be applied to snow vehicles other than snowmobiles if they are equipped with an engine and a track belt.

Moreover, in the above-described preferred embodiments, an engine that is a four-stroke engine has been described. The present invention is not limited to this. A two-stroke engine may also be used.

Additionally, in the above-described preferred embodiment, the output shaft and pump shaft are disposed ahead of the crankshaft. The present invention is not limited to this structure. The output shaft and pump shaft may also be disposed behind the crankshaft.

Further, in the above-described preferred embodiments, the driving power from the crankshaft is transmitted to the pump system via a chain. The invention is not limited to this example of structure. The driving power from the crankshaft may also be transmitted to the pump system via a gear or the like.

While the present invention has been described with respect to preferred embodiments, it will be apparent to those skilled in the art that the disclosed invention may be modified in numerous ways and may assume many preferred embodiments other than those specifically set out and described above. Accordingly, it is intended by the appended claims to cover all modifications of the present invention which fall within the true spirit and scope of the invention.

What is claimed is:

1. A snow vehicle comprising:
   an engine including a crankshaft and a balancer shaft;
   a track belt disposed behind said engine with respect to a forward running direction of the vehicle; and
   a front axle arranged to transmit driving power from said engine to said track belt; wherein
   said balancer shaft is disposed entirely above a line connecting said crankshaft and said front axle, and located near a rear end of said crankshaft and behind said crankshaft.

2. The snow vehicle according to claim 1, further including a starter motor for starting said engine, wherein said starter motor is disposed below the line connecting said crankshaft and said front axle and behind said crankshaft with respect to the forward running direction of the vehicle.

3. The snow vehicle according to claim 1, wherein said engine further includes an output shaft for transmitting driving power from said crankshaft to outside of said engine, and wherein said output shaft is disposed above the line connecting said crankshaft and said front axle and ahead of said crankshaft with respect to the forward running direction of the vehicle.

4. The snow vehicle according to claim 3, further including a secondary shaft which is located behind said crankshaft with respect to the forward running direction of the vehicle and which has a first driving power-transmitting portion for transmitting driving power from said output shaft to said front axle, wherein said output shaft includes a primary shaft having a second driving power-transmitting portion for transmitting the driving power to said first driving power-transmitting portion of said secondary shaft.

5. The snow vehicle according to claim 3, wherein said engine further includes a first speed reduction gear mounted to said crankshaft and a second speed reduction gear mounted to said output shaft, and wherein the driving power from said crankshaft is transmitted to said output shaft via said first and second speed reduction gears.

6. The snow vehicle according to claim 1, wherein said engine further includes a pump system disposed inside said engine, and wherein the driving power is transmitted to said pump system from said crankshaft via a chain.

7. The snow vehicle according to claim 6, wherein said pump system includes a pump shaft to which the driving power is transmitted from said crankshaft, and wherein said pump shaft is disposed below the line connecting said crankshaft and said front axle and ahead of said crankshaft with respect to the forward running direction of the vehicle.

8. The snow vehicle according to claim 7, wherein said pump system further includes an oil pump and a water pump having respective pump shafts, and wherein the pump shafts of said oil pump and said water pump are arranged coaxially.

9. The snow vehicle according to claim 8, wherein said oil pump is disposed near a widthwise center of said engine, and wherein said water pump is disposed outside said oil pump in the widthwise direction of the engine.

10. The snow vehicle according to claim 1, wherein said engine is mounted to said crankshaft and further includes a first speed reduction gear for transmitting the driving power from said crankshaft to an output shaft, and wherein the driving power is transmitted to said balancer shaft from said first speed reduction gear.

11. The snow vehicle according to claim 10, wherein said engine further includes a balancer shaft-driving gear mounted to said balancer shaft, and wherein said balancer shaft-driving gear is positioned to engage said first speed reduction gear.

12. The snow vehicle according to claim 11, wherein said engine further includes a camshaft for driving intake and exhaust valves and a cam chain for transmitting the driving power from said crankshaft to said camshaft, a balancer weight and said balancer shaft-driving gear are mounted to said balancer shaft and spaced from each other by a given distance, and said cam chain is disposed between said balancer weight and said balancer shaft-driving gear axially of said balancer shaft.

13. The snow vehicle according to claim 1, wherein a top of said engine is arranged to tilt rearwardly with respect to the forward running direction of the vehicle.

14. The snow vehicle according to claim 1, wherein said engine is a four-stroke engine.

15. A snow vehicle comprising:
an engine including a crankshaft and a balancer shaft;
an intake passage disposed in a front portion of said engine;
an exhaust passage disposed in a rear portion of said engine;
a track belt disposed behind said engine with respect to a forward running direction of the vehicle; and
a front axle for transmitting driving power from said engine to said track belt; wherein
said balancer shaft is disposed entirely above a line connecting said crankshaft and said front axle, and located near a rear end of said crankshaft and behind said crankshaft.

16. The snow vehicle according to claim 15, further including a starter motor for starting said engine, wherein said starter motor is disposed below the line connecting said crankshaft and said front axle and behind said crankshaft with respect to the forward running direction of the vehicle.

17. The snow vehicle according to claim 15, wherein said engine further includes an output shaft for transmitting driving power from said crankshaft to an outside of said engine, and wherein said output shaft is disposed above the line connecting said crankshaft and said front axle and ahead of said crankshaft with respect to the forward running direction of the vehicle.

18. The snow vehicle according to claim 17, further including a secondary shaft which is disposed behind said crankshaft with respect to the forward running direction of the vehicle and which has a first driving power-transmitting portion for transmitting driving power from said output shaft to said front axle, wherein said output shaft includes a primary shaft having a second driving power-transmitting portion for transmitting the driving power to said first driving power-transmitting portion of said secondary shaft.

19. The snow vehicle according to claim 17, wherein said engine further includes a first speed reduction gear mounted to said crankshaft and a second speed reduction gear mounted to said output shaft, and wherein the driving power from said crankshaft is transmitted to said output shaft via said first and second speed reduction gears.

20. The snow vehicle according to claim 15, wherein said engine further includes a pump system disposed inside said engine, and wherein the driving power is transmitted to said pump system from said crankshaft via a chain.

21. The snow vehicle according to claim 20, wherein said pump system includes a pump shaft to which the driving power is transmitted from said crankshaft, and wherein said pump shaft is disposed below the line connecting said crankshaft and said front axle and ahead of said crankshaft with respect to the forward running direction of the vehicle.

22. The snow vehicle according to claim 21, wherein said pump system further includes an oil pump and a water pump having respective pump shafts, and wherein the pump shafts of said oil pump and said water pump are arranged coaxially.

23. The snow vehicle according to claim 22, wherein said oil pump is disposed near a widthwise center of said engine, and wherein said water pump is disposed outside said oil pump in the widthwise direction of the engine.

24. The snow vehicle according to claim 15, wherein said engine is mounted to said crankshaft and further includes a first speed reduction gear for transmitting the driving power from said crankshaft to said output shaft, and wherein the driving power is transmitted to said balancer shaft from said first speed reduction gear.

25. The snow vehicle according to claim 24, wherein said engine further includes a balancer shaft-driving gear mounted to said balancer shaft, and wherein said balancer shaft-driving gear is arranged to engage said first speed reduction gear.

26. The snow vehicle according to claim 25, wherein said engine further includes a camshaft for driving intake and exhaust valves and a cam chain for transmitting the driving power from said crankshaft to said camshaft, a balancer weight and said balancer shaft-driving gear are mounted to said balancer shaft and spaced from each other by a given distance, and said cam chain is disposed between said balancer weight and said balancer shaft-driving gear axially of said balancer shaft.

27. The snow vehicle according to claim 15, wherein a top of said engine is arranged to tilt rearwardly in the forward running direction of the vehicle.

28. The snow vehicle according to claim 15, wherein said engine is a four-stroke engine.

* * * * *